United States Patent
Menolfi et al.

(10) Patent No.: US 7,447,278 B2
(45) Date of Patent: Nov. 4, 2008

(54) APPARATUS FOR TRANSMITTING AND RECEIVING DATA

(75) Inventors: Christian Menolfi, Zurich (CH); Martin Schmatz, Rueschlikon (CH); Thomas Toifl, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 10/849,693

(22) Filed: May 20, 2004

(65) Prior Publication Data

US 2005/0002475 A1    Jan. 6, 2005

(30) Foreign Application Priority Data

May 21, 2003    (EP)    ................... 03405354

(51) Int. Cl.
*H03D 1/00*    (2006.01)
(52) U.S. Cl. .................. 375/340; 375/290; 375/291
(58) Field of Classification Search ............. 375/219, 375/220, 295, 316, 340, 354, 355, 358, 286, 375/290, 291
See application file for complete search history.

(56) References Cited

U.S. PATENT DOCUMENTS 6,731,683 B1 *   5/2004   Fiedler et al. ............. 375/232
2005/0111585 A1 *   5/2005   Stojanovic et al. .......... 375/316

OTHER PUBLICATIONS

Dally, William J. "Transmitter Equalization for 4-GBPS Signaling," IEEE Micro, Jan./Feb. 1997, pp. 48-56.
Kim, J. and Mark A. Horowitz. "Adaptive Supply Serial Links With Sub-1-V Operation and Per-Pin Clock Recovery," IEEE Journal of Solid-State Circuits, vol. 37, No. 11, Nov. 2002, pp. 1403-1413.

* cited by examiner

*Primary Examiner*—David C. Payne
*Assistant Examiner*—Leon Flores
(74) *Attorney, Agent, or Firm*—Michael J. Bucherhorner; Douglas W. Cameron (57) ABSTRACT

The apparatus for transmitting and receiving data according to the invention contains a transmitter (1) for serial data transmission and a receiver (3) for receiving a transmitted data signal (g(t)). The receiver (3) in turn comprises a first sample latch (11) for sampling the received data signal (g(t)) with a first clock (f2) and for generating a first sample value (an). The receiver (3) also comprises a second sample latch (13) for sampling a first shifted received data signal (g(t)+V1) with a second clock (f1) and for generating a second sample value (yn). The receiver (3) further comprises a third sample latch (14) for sampling a second shifted received data signal (g(t)−V1) with the second clock (f1) and for generating a third sample value (zn). Finally the receiver (3) comprises a logic unit (15) for recovering data (dn) out of said first, second and third sample values (an, yn, zn).

10 Claims, 5 Drawing Sheets

APPARATUS FOR TRANSMITTING AND RECEIVING DATA

TECHNICAL FIELD

The present invention relates to an apparatus for transmitting and receiving data which is usable in a high-speed serial link.

BACKGROUND OF THE INVENTION

High-speed serial links are used to transmit data from rack to rack over wired media, such as a backplane. The requirements on these high-speed links are not only high data rate, for example >5 Gbit/s, but also very low power consumption, advantageously □10 mW/Gbit/s, and small chip area. The general link model is displayed in FIG. 1. A transmitter 1, integrated on-chip, gets data dnTX from a not shown processing unit, prepares the data dnTX for transmission and sends the prepared data f(t) over a transmission channel 2, which is then received by a receiver 3. For the improvement of the transmission quality the transmitter/receiver system 1, 3 and the transmission channel 2 are designed as differential data link. Therefore, the transmission channel 2 comprises two lines, wherein over the first line the data signal f(t) and over the second line the inverted data signal is transferred. Several of these transmitters 1 and receivers 3 may be integrated on-chip. The transmission channel 2 can be for example a combination of printed-circuit board, connectors, backplane wiring and cable. At high frequencies the transmission channel 2 shows attenuation, what may lead to a decreasing transmission quality. Since the attenuation of the transmission channel 2 at these data rates is substantial even for short distances, intersymbol interference (ISI) causes a significant deterioration of the jitter budget. Until the present date, the preferred signaling scheme for the data transfer is a non-return to zero (NRZ) signaling.

Figure 1:
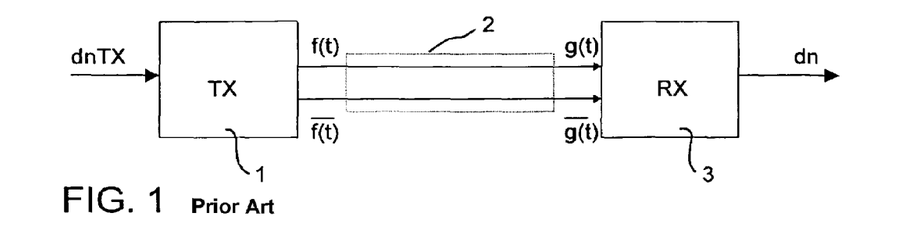
FIG. 1 a serial data link as it is known from the prior art.

Assuming that the high-frequency attenuation is small enough, this transmission method according to FIG. 1 has the advantage of a relatively simple and proven implementation. Such an implementation is explained in W. J. Dally, J. Poulton, "Equalized 4 Gbps CMOS Signaling", IEEE Micro, pp 58-56, January-February 1997. As displayed in FIG. 2, the received data g(t) is sampled in the middle of the eye 41 at the sampling point an and at the edges at the sampling point xn, where the former samples an are used to extract the data, and the latter samples xn to extract the timing information. The vertical opening VO of the eye is approximately proportional to the attenuation of the frequency at half the symbol rate, e.g. 5 GHz for a 10 Gbit/s system. If the attenuation at this frequency is too high, the vertical eye opening VO will finally become too small to assure reliable data detection. One possible solution is the use of multi-level pulse amplitude modulation (PAM), which reduces the bandwidth of the signal. This comes at the price of a decrease in the eye opening VO, for example a factor of 3 for PAM-4 as compared to NRZ, and a considerable increase in complexity. First, the transmitter 1 must be able to generate multi-level values with high linearity. Secondly, the clock recovery in the receiver 3 and the adaptive equalization require a large amount of additional hardware. Additionally, the number of edge transitions, which can be used for clock recovery is smaller in a PAM system than in a symbol rate system, which makes it more difficult for the clock recovery circuit to follow clock frequency offsets and sinusoidal jitter.

Another solution is to use partial response signaling together with a decision-feedback equalizer (DFE) at the receiver 3. A major drawback of this solution is however the problem of error-propagation, which forbids to combine such a receiver with a simple encoding scheme, e.g. a Hamming code, being able to correct single bit errors.

Figure 2:
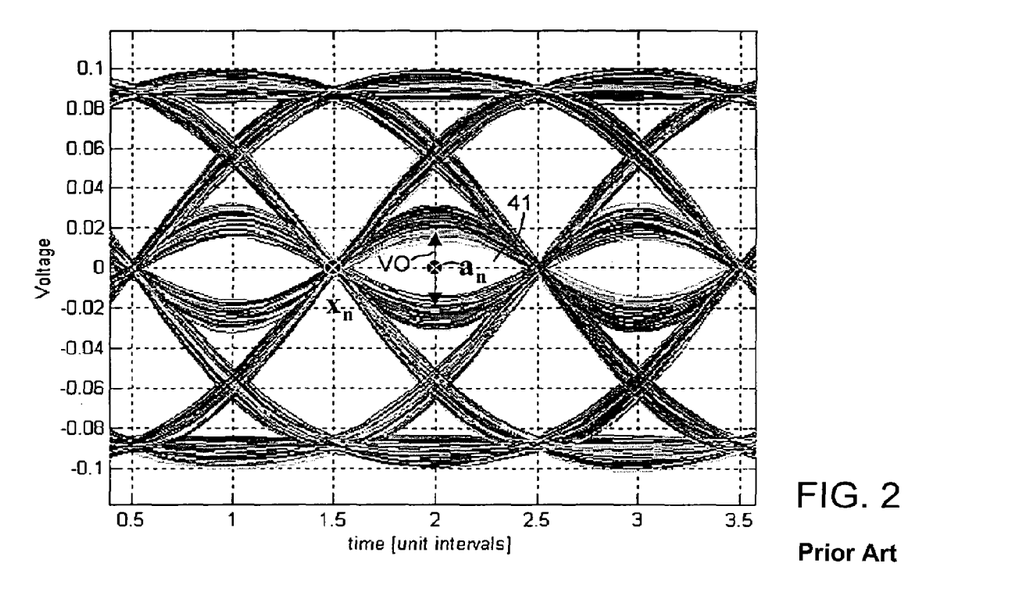
FIG. 2 a time diagram with several data eyes, where two samples for data and clock recovery are laid in the cross point of several data eyes and in the middle of a data eye respectively, FIG. 3 a block diagram of an embodiment of a serial high-speed data link according to the invention, FIG. 4a a time diagram with several data eyes, where four samples for data and clock recovery are laid in the cross point of several data eyes, in the middle of a first data eye, in the middle of a second data eye and in the middle of a third data eye respectively, FIG. 4b a further time diagram with several data eyes with increased vertical eye openings, where four samples for data and clock recovery are laid in the cross point of several data eyes, in the middle of a first data eye, in the middle of a second data eye and in the middle of a third data eye respectively, FIG. 5 a more detailed block diagram of an embodiment of the transmitter of the apparatus according to the invention, FIG. 6 a more detailed block diagram of an embodiment of the receiver of the apparatus according to the invention, FIG. 7 a block diagram of the logic unit which is a part of the receiver shown in FIG. 6 according to the invention, FIG. 8 a block diagram of the adaptation unit for adapting filter coefficients of the transmitter which is a part of the logic unit shown in FIG. 7, FIG. 9 a block diagram of a phase rotator, which is a part of the receiver shown in FIG. 6, and FIG. 10 a structure of a current mode logic, which is also a part of the receiver shown in FIG. 6.

A further solution is to employ duobinary coding. Duobinary coding is advantageously used in transmission systems in order to reduce the transmission bandwidth or to increase the transmission capacity. In case of Duobinary coding, a special case of partial response binary coding, the system allows that a binary signaling pulse is spread over a duration of two bit times by the channel distortion. In consequence, the bandwidth requirements on the channel are reduced by roughly 35 percent. Although the pulse width sent at the transmitter side corresponds to one bit time, the duration of the received impulse is two bit times. The superposition of the received impulses then results in a pseudo-ternary signal on the receiver side, as seen in FIG. 2, where the signal at time 1.5 can take on the values of 0.85, 0, −0.85. In order to avoid error propagation when the signal is decoded, the binary signal at the transmitter has to be pre-coded with the method described in J. Proakis, "Digital Communications", 4th edition, McGraw Hill, pp. 565-568. Advantageously, duobinary signaling allows extending the distance of binary links for only a modest increase in additional complexity, and does not suffer from error propagation.

SUMMARY OF THE INVENTION

An object of the invention is to provide an apparatus for transmitting and receiving data, which ensures a high quality serial data transmission, improves the jitter tolerance and moreover consumes less energy.

Advantageously the apparatus for transmitting and receiving data according to the invention is suitable for serial high-speed data transfer.

The apparatus for transmitting and receiving data according to the invention contains a transmitter for serial data transmission and a receiver for receiving a transmitted data signal. The receiver in turn comprises a first sample latch for sampling the received data signal with a first clock and for generating a first sample value. The receiver also comprises a second sample latch for sampling a first shifted received data signal with a second clock and for generating a second sample value. The receiver further comprises a third sample latch for sampling a second shifted received data signal with the second clock and for generating a third sample value. Finally the receiver comprises a logic unit for recovering data out of said first, second and third sample values.

Advantageous further developments of the invention arise from the characteristics indicated in the dependent patent claims.

Preferably the receiver of the apparatus according to the invention comprises for generating the first shifted received data signal a means for adding a certain amount to the received data signal.

In another embodiment of the invention the receiver of the apparatus comprises for generating the second shifted received data signal a means for adding a second certain amount to the received data signal.

In a further embodiment of the invention the receiver of the apparatus comprises a fourth sample latch for sampling the received data signal with the second sampling clock and for generating a fourth sample value. Moreover, the receiver comprises a clock recovery unit for recovering the clock of the received data signal with the help of the first and the fourth sample values.

In a still further embodiment of the invention the transmitter of the apparatus comprises a filter for filtering the data signal which shall be transmitted. With that, the signal to be transmitted is already prepared in the transmitter in such a way that it is easier for the receiver to recover the data.

Furthermore the filter can be formed as adaptive filter with adjustable filter coefficients and the receiver can comprise a means for adaptation of the filter coefficients. The means for adaptation in turn comprises a feedback output which can be connected to a control input of the adaptive filter. This has the advantage that a change of the channel parameters does not influence the transmission quality.

For solving an object of the invention it is suggested that the filter of the apparatus is a feed forward equalization filter.

In another aspect of the apparatus according to the invention the means for adaptation comprises a means for generating out of the fourth sample value and certain previous first sample values filter correction values which are available at the feedback output.

In a typical application the means for generating the correction values comprises a correlation unit for correlating the fourth sample value with the previous first sample values. The means for generating the correction values further comprises an average generating unit which is subordinated to the correlation unit. Thus, the filter coefficients can easily be adapted.

The transmitter of the apparatus according to the invention preferably comprises a duobinary precoder for decoding a binary data signal into a duobinary data signal and a multiplexer wherein the multiplexer is provided for either forwarding the duobinary data signal or the binary data signal. With that, the apparatus according to the invention gets more flexible.

Depending on the operating conditions it can be chosen, if a binary data signal or a duobinary data signal shall be transferred. Thus, the specific advantages of the binary and the duobinary transfer mode can be made us of.

According to a further embodiment of the invention the sample latch of the apparatus can be formed as current mode logic.

The present invention also relates to an apparatus wherein the receiver comprises at its input a high pass filter.

The receiver of the apparatus according to the invention can also comprise at its input an amplifier.

In a preferred embodiment of the invention the receiver of the apparatus comprises a phase locked loop for generating the first and second clock.

Finally, the transmitter and the receiver of the apparatus according to the invention typically comprise a control input for applying a control signal with which the transmitter and the receiver can be switched in binary transmission mode or in duobinary transmission mode.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE DRAWINGS

As already described above, FIG. 1 shows a serial data link as it is known from the prior art. Regarding further explanations for this, it is referred to the section background of the invention of this application.

FIG. 2 shows a time diagram with several data eyes. The x-axis of the diagram corresponds to the time axis and the y-axis corresponds to the voltage. A first sample xn is laid in the cross point of several data eyes. A second sample an is located in the middle of a data eye 41. The serial data link according to the prior art shown in FIG. 1 uses the samples an and xn for clock recovery, whereas only the second sample an is used for data recovery.

Figure 3:
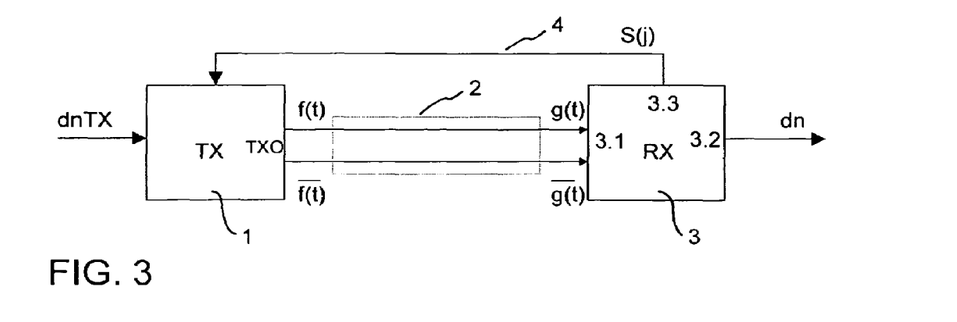

In one embodiment of a serial high-speed data link according to the invention a feedback channel 4 is provided as it is shown in FIG. 3. Over the feedback channel 4 a correction signal S(j), which is available at the output 3.3 of the receiver 3, is send from the receiver 3 to the transmitter 1 to adapt a signal filter of the transmitter. The structure of the therefore necessary transmitter and receiver is explained in the following.

Figure 4A:
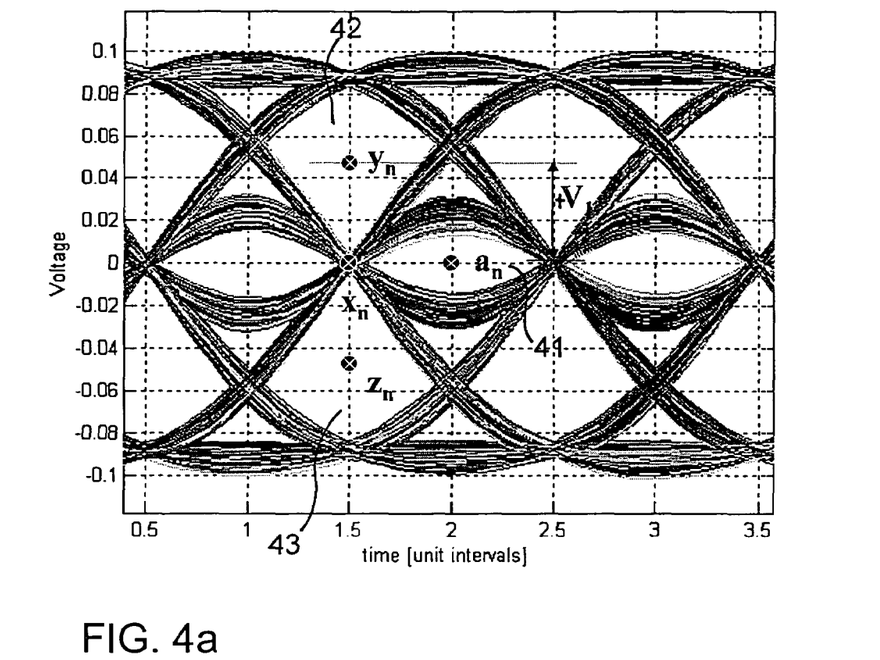
Figure 4B:
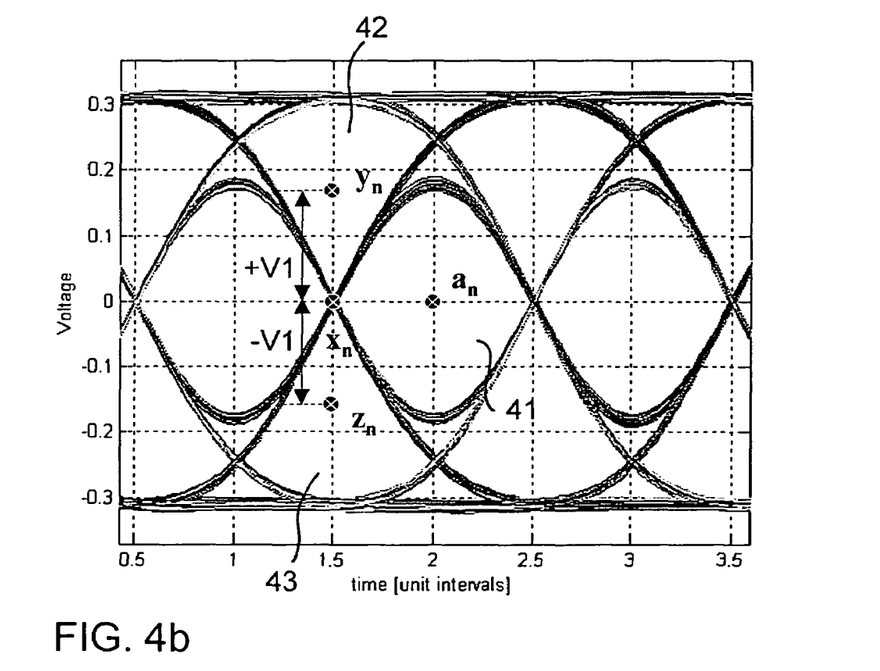

In a further embodiment of a serial high-speed data link according to the invention two further samples are used. As depicted in the diagrams of FIGS. 4a and 4b, in the apparatus for transmitting and receiving data according to the invention two additional samples yn and zn are used, from which the duobinary data can be derived. In order to increase jitter tolerance it is proposed to combine these samples yn and zn with the samples an in order to extract the data dn out of the received data signal g(t). The samples yn are shifted by an amount +V1 and located in a upper data eye 42, whereas the samples zn are shifted by an amount −V1 and located in a lower data eye 43. The structure of the therefore necessary transmitter 1 and receiver 3 is also explained in the following.

To cover a wide variety of transmission channels 2 an embodiment of the system according to the invention also supports data transmission in NRZ mode. This can be seen from FIG. 4b, where the data eye 41 is displayed for the case of modest channel attenuation. Clearly, in this case, the NRZ eye 41 is bigger than the duobinary data eyes 42 and 43.

Figure 5:
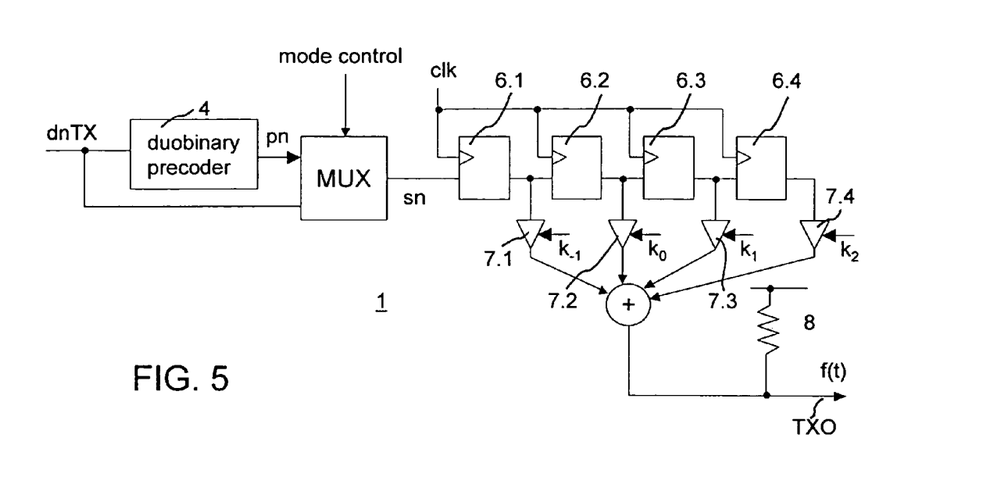

A block diagram of the transmitter is depicted in FIG. 5. Binary data dnTX enters the transmitter 1 at the symbol rate. A control bit called mode control determines if the system, including the transmitter 1 and the receiver 3, works in non-return to zero (NRZ) or duobinary mode. When the system works in NRZ-mode the data dnTX is passed directly via a multiplexer MUX to a following stage 6.1 to 6.4. When the system works in duobinary mode, the data dnTX is converted to duobinary data pn by a duobinary precoder 4 according to the following table:

| dnTX | pn − 1 (previous bit) | pn |
|---|---|---|
| 0 | 0 | 1 |
| 0 | 1 | 0 |
| 1 | 0 | 0 |
| 1 | 1 | 1 |

The symbol sn at the output of the multiplexer MUX is then fed into a discrete-time feed-forward equalizer (FFE) structure 6.1 to 6.4., where the coefficients k-1, k0, k1, k2 can be is freely selected by changing the currents in line-drivers 7.1 to 7.4. The outputs of the line drivers 7.1 to 7.4 are connected to the output TXO of the transmitter 1 and to a termination resistance 8 to avoid reflections. The output TXO of the transmitter 1 in turn is connected to the transmission channel 2, which is not shown in FIG. 5.

The feed-forward equalizer 6.1 to 6.4 forms a filter, which is provided as shown in FIG. 5 at the transmit side of the serial high-speed data link where it can be easily implemented. Hence, both the data and timing recovery signal paths undergo the same filtering.

Figure 6:
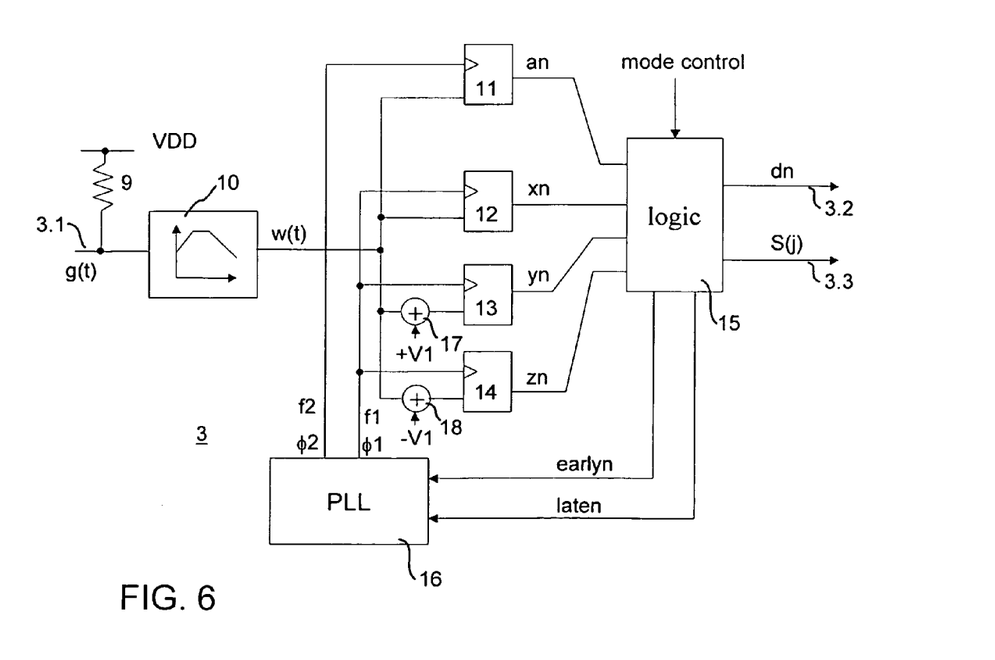

A block diagram of the receiver 3 is depicted in FIG. 6. After passing through the transmission channel 2, the data signal g(t) is received by an input amplifier 10, which can also provide some amount of equalization by implementing a high-pass filter function. The amplified and filtered data signal w(t) is then sampled by four latches 11, 12, 13 and 14, each of them comprising a comparator function for comparing the input with a threshold (e.g. 0V) at times defined by the clock. The three latches 12, 13 and 14, which receive a in-phase clock f1, provide the three samples xn, yn and zn. The input of the latch 13 is shifted by an amount of +V1 through a voltage addition stage 17 while the input of the latch 14 is shifted by an amount of −V1 through a voltage addition stage 18. The latch 11 is clocked by a clock f2, being shifted by 180 degrees relative to the clock f1, and provides the samples an. The two clocks f1 and f2 with the corresponding phases φ1 and φ2 are generated by a phase locked loop (PLL) 16. Therefore, the PLL 16 uses two control signals earlyn and laten which are from the logic unit 15.

Figure 9:
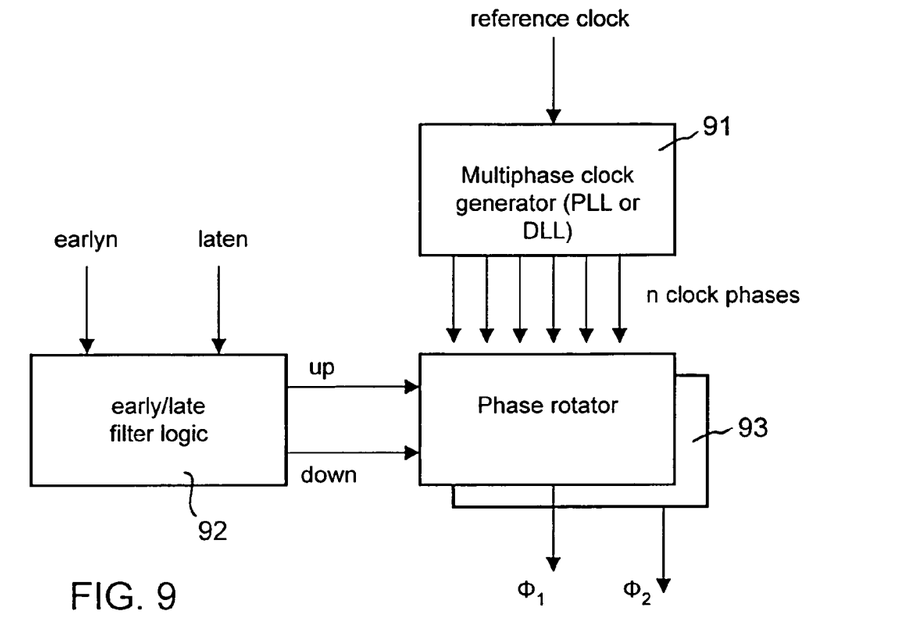

A possible embodiment of the PLL 16 is described in FIG. 9. The digital PLL 16 consists of a multiphase clock generator 91, a filter logic 92 to filter the two control signals earlyn and laten generated by the logic unit 15 of the receiver 3, and a phase rotator 93. The multiphase clock generator 91 can be implemented with an analog PLL such as described in US 2002/0136343 A1, item 12 or a delay locked loop (DLL). The filter logic 92 for the control signals earlyn and laten is in the simplest case a digital counter, or a more complicated state machine, such as described in FIGS. 4 and 5 and the corresponding specification of US2002/0094055 A1. A possible embodiment of the phase rotator 93 is described in US2002/0136343 A1, item 106.

As already explained above, the data link can be switched from the binary mode into the duobinary mode. Therefore, beside the transmitter 1 also the receiver 3 comprises a control input for a control bit called mode control. The control bit is evaluated by the control unit 15, which is a part of the receiver 3. If the control bit is set the logic unit 15 and therefore also the receiver 3 works in binary mode, otherwise it works in duobinary mode.

The sample values xn, yn, zn and an generated by the latches 11 to 14 are led to the logic unit 15 which provides the following functionalities:
(1) Generating the decoded received data dn,
(2) deriving a first control signal earlyn and a second control signal laten for the clock recovery, and
(3) deriving data/edge correlation signals wn(j) and the correction signal S(j) for adaptation of the feed-forward equalizer 6.1-6.4 of the transmitter 1.

In the following the generation of the decoded received data dn, which are available at the output 3.2 of the receiver 3, is explained.

In the NRZ mode, this means the receiver works in binary mode, the recovered data dn is simply of the sample an.

In the prior art duobinary sampling decodes the received data by evaluating only the sample values yn and zn according to the following table:

| yn | zn | dn |
|---|---|---|
| 0 | 0 | 1 |
| 0 | 1 | 0 |
| 1 | 0 | 0 |
| 1 | 1 | 1 |

According to one embodiment of the invention the sample values an, yn and zn are combined to increase jitter tolerance. By including also the NRZ data samples an in the decision, the jitter tolerance can however be increased and with that improved. This can be seen, for example, by looking at one of the large rising transitions in the eye diagram, i.e. going from −0.1 V to +0.1 V in FIG. 4a. Since the sample value zn is not exactly between two such transmissions the jitter tolerance suffers an error which occurs if the transition gets shifted to the right by 0.35 unit intervals. Taking into account also the NRZ sample an, which is exactly in the center of two such transitions, this therefore leads to a higher jitter tolerance, and hence a smaller error probability. The samples yn, zn and an are thereby combined as shown in the following table.

| yn | zn | an | dn |
|---|---|---|---|
| 0 | 0 | 0 | 1 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

Figure 7:
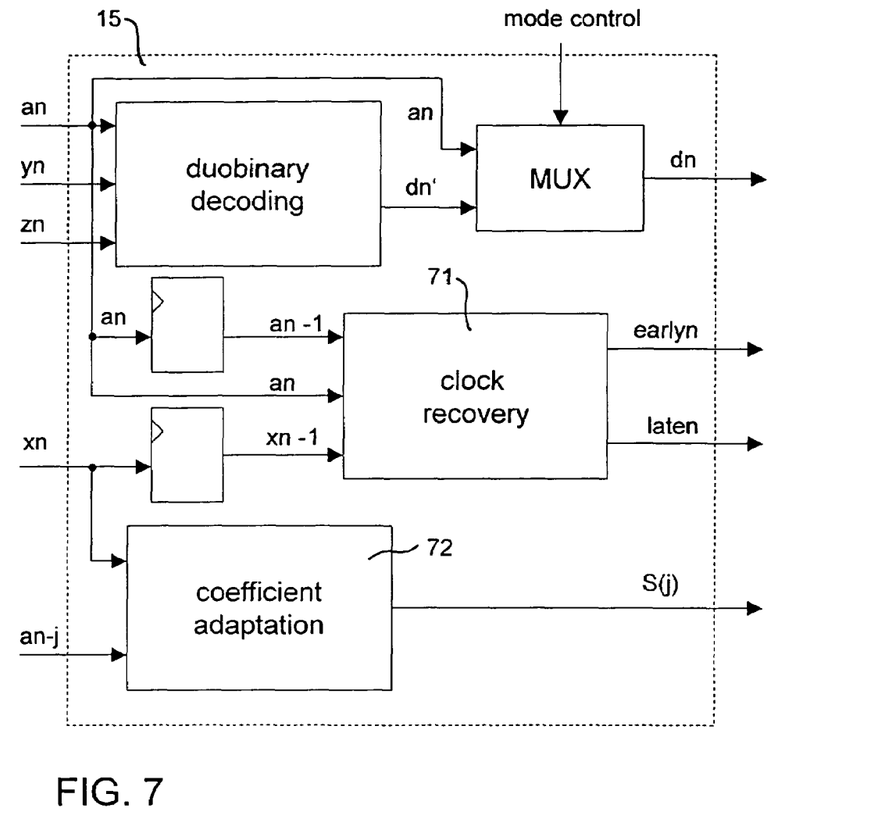

In the following the derivation of the first control signal earlyn and the second control signal laten for the clock recovery with the help of the logic unit 15 is described. Therefore, the logic unit 15 comprises a clock recovery unit 71 as shown in FIG. 7. The early signal earlyn and the late signal laten are generated from the sample values an and xn through:

earlyn=$(a_{n-1} \oplus a_n)$ & $(a_n \oplus x_{n-1})$ laten=$(a_{n-1} \oplus a_n)$ & $(\text{not}(a_n \oplus x_{n-1}))$ wherein an−1 and xn−1 are previous sample values, & denotes the logical AND, and ⊕ denotes the XOR operator.

The following table shows which logical values the control signals earlyn and laten adopt depending on the sample values an−1, an and xn−1:

| an − 1 | an | xn − 1 | earlyn | laten |
|--------|----|--------|--------|-------|
| 0 | 0 | 0 | 0 | 0 |
| 0 | 0 | 1 | 0 | 0 |
| 0 | 1 | 0 | 1 | 0 |
| 0 | 1 | 1 | 0 | 1 |
| 1 | 0 | 0 | 0 | 1 |
| 1 | 0 | 1 | 1 | 0 |
| 1 | 1 | 0 | 0 | 0 |
| 1 | 1 | 1 | 0 | 0 |

The data/edge correlation signals wn(j) for the adaptation of the feed-forward equalizer 6.1 to 6.4 are derived with the help of a coefficient adaptation unit 72 which is a part of the logic unit 15 as follows. In order to condition the data eye for duobinary signaling the adaptive equalization algorithm as described below is used. The equalization algorithm adapts the filter coefficients k-1, k0, k1 and k2 in the transmitter 1 such that a node is created in the data eye at the sampling position of xn. The equalization algorithm is based on the correlation between the edge data samples xn and the data samples an−j, where j is an index corresponding to the index of the filter coefficient kj which is to be adapted. To derive the statistics the logic unit 15 of the receiver 3 delivers the data/edge correlation signals $w_n(j)$:

$$w_n(j) = x_n \oplus a_{n-j}$$

For the transmitter shown in FIG. 5, the index j takes on the values {−1, 1, 2}, corresponding to one pre-cursor equalization tap, and two post-cursor taps. The index j=0 corresponds to the main tap, which is constant, e.g. set to 1.0. The number of taps can be adjusted in other implementations.

As algorithm for updating the filter coefficients k-1, k0, k1, k2 of the transmitter 1 a zero-forcing algorithm is used. The algorithm results in a simple implementation, suitable for the low-power requirements of the serial high-speed data link. Since the parameters of the electrical transmission channel 2 vary very slowly, mainly due to the effects of drifts in temperature, the algorithm for updating the coefficients k-1 to k2 can run at a speed several orders of magnitude slower than the timing recovery. The loop dynamics of the two mechanisms, the algorithm for updating the coefficients and the timing recovery, can thus be separated. The zero-forcing solution for updating the filter coefficients is achieved by forcing the cross correlation between the sample values xn and an−j to zero. For the following description it is assumed that all binary samples represent the values −1 or 1. Since the sample values xn only contain useful information on actual edge transitions, they are combined with the edge-detect signal θn, where $$\theta_n = (1 - a_n a_{n-1})$$

to yield the update signal $\epsilon_n^{(k)}$:

$$\epsilon_n^{(j)} = \theta_n x_n a_{n-j}.$$

In the case of a binary edge sampler, this means the system works in binary mode, the update signal $\epsilon_n^{(j)}$ takes the form $$\epsilon_n^{(j)} = \theta_n \text{sign}(x_n) a_{n-j}$$

resulting in a sign-sign adaptation algorithm. The filter coefficients k-1 to k2 are adjusted by $$k_{n+1}^{(j)} = k_n^{(j)} - \Delta \cdot \epsilon_n^{(j)}, \{j=-1, 1, 2\}$$

wherein Δ denotes the adaptation step size.

Figure 8:
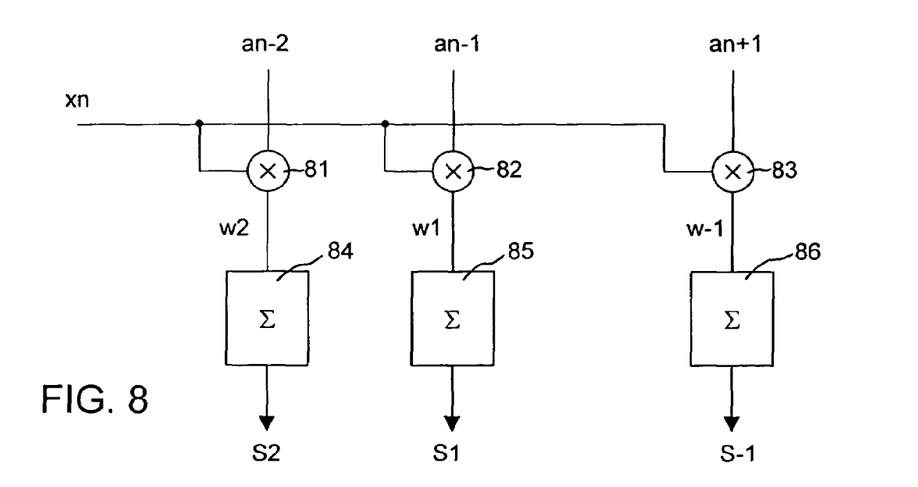

The coefficient adaptation unit 72 has the structure shown in FIG. 8, which can be easily implemented in digital logic. Therefore, the adaptation unit 72 comprises a first XOR-gate 81 which joins the sample an−2 with the sample xn, a second XOR-gate 82 which joins the sample an−1 with the sample xn and finally a third XOR-gate 83 which joins the sample an+1 with the sample xn. The XOR-gates 81, 82 and 83 serve as correlation means. The results w2, w1 and w-1 of the joins are lead to a first summation unit 84, a second summation unit 85 and a third summation unit 86 respectively. The summation units 84 to 86 are only enabled when the edge detect signal θn is active. In the preferred digital implementation the edge detect signal θn is derived as:

$$\theta_n = a_n \oplus a_{-1}$$

The summation process is run until a certain number N of edges has been detected. Thereafter, the values of the equalization coefficients kj are incremented by the adaptation step size Δ if the outputs Sj of the summation units 84 to 86 are >N/2, or decremented otherwise. Also, all summation units are reset, and the process is repeated.

The summation units 84, 85 and 86 generate out of the jointed values w2, w1 and w-1 average values S1, S-1 and S2 which represent the correction values for adapting the filter coefficients k2, k1, k-1.

Figure 10:
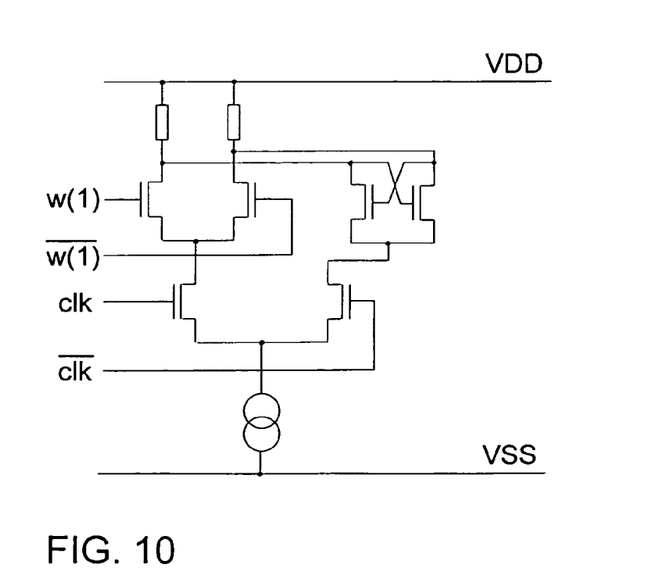

The latches 11, 12, 13 and 14 may be structured as depicted in FIG. 10. The latch as shown in FIG. 10 is a current mode logic (CML).

Having illustrated and described a preferred embodiment for a novel method and apparatus for, it is noted that variations and modifications in the method and the apparatus can be made without departing from the spirit of the invention or the scope of the appended claims.

| REFERENCE SIGNS | |
|---|---|
| an | sample |
| clk | clock |
| dnTX | serial data |
| dn | recovered serial data |
| earlyn | control signal |
| f(t) | transmitted data signal |
| f1 | clock frequency |
| f2 | clock frequency |
| g(t) | received data signal |
| k-1 | filter coefficient |
| k0 | filter coefficient |
| k1 | filter coefficient |
| k2 | filter coefficient |
| laten | control signal |
| pn | duobinary data |
| sn | data to be transmitted |
| S1 | output of the summation unit |
| S2 | output of the summation unit |
| S-1 | output of the summation unit |
| TXO | transmitter output |
| V1 | amount or threshold value |
| VO | vertical eye opening |
| w(t) | amplified and filtered data signal |
| wn(j) | correction values |
| S(j) | correction signal |
| xn | sample |
| yn | sample |
| zn | sample |
| 1 | transmitter |

-continued

| REFERENCE SIGNS | |
|---|---|
| 2 | transmission channel |
| 3 | receiver |
| 3.1 | receiver input |
| 3.2 | receiver output |
| 3.3 | control input of the receiver |
| 4 | feedback channel |
| 6.1 | filter stage |
| 6.2 | filter stage |
| 6.3 | filter stage |
| 6.4 | filter stage |
| 7.1 | driver stage |
| 7.2 | driver stage |
| 7.3 | driver stage |
| 7.4 | driver stage |
| 8 | termination resistor |
| 9 | termination resistor |
| 10 | input amplifier and filter |
| 11 | sample latch |
| 12 | sample latch |
| 13 | sample latch |
| 14 | sample latch |
| 15 | logic unit |
| 16 | PLL |
| 17 | summation unit |
| 18 | summation unit |
| 41 | duobinary data eye |
| 42 | duobinary data eye |
| 43 | binary data eye |
| 71 | clock recovery unit |
| 72 | unit for filter coefficient adaptation |
| 81 | XOR-gate |
| 82 | XOR-gate |
| 83 | XOR-gate |
| 84 | adder |
| 85 | adder |
| 86 | adder |
| 91 | multiphase clock generator |
| 92 | filter logic |
| 93 | phase rotator |

The invention claimed is:

1. An apparatus for transmitting and receiving data, said apparatus comprising:

a transmitter for serial data transmission, said transmitter comprising:

a filter for filtering a data signal to be transmitted, said filter formed as an adaptive filter with adjustable filter coefficients (k-1, k0, k1, k2);

a duobinary precoder for decoding a binary data signal into a duobinary data signal;

a multiplexer for forwarding said duobinary data and said binary data signal; and a control input for applying a control signal that enables the transmitter to switch between binary transmission mode and duobinary transmission mode;

a receiver for receiving the transmitted data signal (g(t)), said receiver comprising:

an adapter for adaptation of the filter coefficients (k-1, k0, k1, k2) and for providing a feedback output which can be connected to a control input of the adaptive filter;

a first sample latch for sampling said received data signal (g(t)) with a first clock (f2) and for generating a first sample value (an), a second sample latch for sampling a first shifted received data signal (g(t)+V1) with a second clock (f1) and for generating a second sample value (yn), a third sample latch for sampling a second shifted received data signal (g(t)−V1) with said second clock (f1) and for generating a third sample value (zn), a fourth sample latch for sampling the received data signal (g(t)) with the second sampling clock (f1) and for generating a fourth sample value (xn), wherein said fourth sample value (xn), together with certain previous first sample values (an-j) serve to filter correction values (S(j)) that are available at the feedback output;

a control input for applying a control signal that enables the receiver to switch between binary transmission mode and duobinary transmission mode; and a logic unit for recovering data (dn) out of said first, second and third sample values (an, yn, zn).

2. An apparatus according to claim 1, wherein said receiver further comprises, for generating said first shifted received data signal (g(t)+V1), a means for adding a certain amount (+V1) to said received data signal (g(t)).

3. An apparatus according to claim 1, wherein said receiver further Comprises, for generating said second shifted received data signal (g(t)−V1), a means for adding a second certain amount (+V1) to said received data signal (g(t)).

4. An apparatus according to claim 1, wherein said receiver further comprises a clock recovery unit for recovering the clock of said received data signal (g(t)) with the help of said first and said fourth sample values (an, xn).

5. An apparatus according to claim 1, wherein said filter is a feed forward equalization filter.

6. An apparatus according to claim 1, wherein said adapter comprises a correlation unit for correlating said fourth sample value (xn) with said previous first sample values (an-j) and which comprises an average generating which is subordinated to said correlation unit.

7. An apparatus according to claim 1, wherein said sample latch comprises current mode logic.

8. An apparatus according to claim 1, wherein said receiver comprises at its input a high pass filter.

9. An apparatus according to claim 1, wherein said receiver comprises at its input an amplifier.

10. An apparatus according to claim 1, wherein said receiver comprises a phase locked loop for generating said first and second clock (f1, f2).

* * * * *